Patented Feb. 6, 1940

2,188,914

UNITED STATES PATENT OFFICE 2,188,914

CARBONYL COMPOUNDS OF STEROIDS AND PROCESS FOR THE MANUFACTURE THEREOF

Karl Miescher, Riehen, and Albert Wettstein and Werner Fischer, Basel, Switzerland, assignors to the firm Society of Chemical Industry in Basle, Basel, Switzerland No Drawing. Application October 27, 1938, Serial No. 237,374. In Switzerland November 12, 1937

4 Claims. (Cl. 260—397)

By the present invention carbonyl compounds of steroids are made by condensing a compound of the steroid series containing the group —CH₂.CO— with a nitroso compound or with a nitric acid ester and converting the product so obtained in manner itself known into a compound containing the group —CO.CO—.

There may be used as parent materials for the invention quite generally steroid compounds containing the group —CH₂.CO— in a side chain or in the nucleus, for example in the form of the atomic groupings

—CO.CH₃;—CH₂.CHO; —CH₂.CO.OR;
—CO.CH₂.CO—; —CO.CH₂.CO.OR (R=hydrogen or a hydrocarbon radical). They may belong, for example, to the sterols or bile acids, to the compounds of the nature of sexual hormones (follicle hormones, corpus luteum hormones and male hormones), to the substances having the effect of the suprarenal cortical hormone or to the aglucones of the animal or vegetable cardiac poisons. Furthermore they may be substituted as desired and may be saturated or unsaturated and of any desired steric configuration.

Nitrous acid itself, whether previously formed or in statu nascendi is above all a suitable nitroso compound for the condensation. There may be used therefore also an alkali nitrite and an acid, an alkyl nitrite such as ethyl or amyl nitrite, especially in the presence of an alkali alcoholate or a mineral acid, nitrosyl chloride, nitrosyl sulfate and the like. Furthermore aromatic nitroso compounds, for example nitrosobenzene, nitrosodialkylanilines such as nitrosodimethylaniline and nitroso-diethylaniline have proved very useful. The condensation is generally conducted in an organic solvent such as alcohol or ether, but it may also be conducted, for example, by causing the nitroso compound to act in substance or in aqueous suspension. The addition of a condensing agent, for example an alkali hydroxide, carbonate, bicarbonate or alcoholate frequently proves advantageous. The condensation of a β-keto-carboxylic acid derivative with a nitroso compound may be accompanied by simultaneous decarboxylation.

For converting the condensation products derived from the nitroso compounds, namely the oximes or anils, into the corresponding α-dicarbonyl or α-ketocarboxylic acid derivative there may be used any of the methods known for bringing about this reaction. Thus the conversion may be caused by a hydrolytic scission, for example by means of a mineral acid, such as hydrochloric acid or sulfuric acid. An oxidative scission is also frequently advantageous. For this purpose chromic acid, permanganates, nitric acid, ferric salts, amyl nitrite and nitrous acid among others have proved to be useful oxidizing agents. Since the two agents last-named may also serve as nitroso compounds for the condensation they lead, when used in excess, directly to the carbonyl compounds, the condensation products formed intermediately being oxidized pari passu with their formation. Aldehydes such as formaldehyde and bisulfites, both usually in acid solution, may also be used for splitting the isonitroso compounds and anils. In cases in which the intermediate product is an oxime it is under some circumstances preferable to proceed by way of the amine instead of using direct hydrolysis or oxidation. For this purpose the oxime is first treated with a reducing agent suitable for the purpose (see for example Houben-Weyl, Methoden der organischen Chemie, III Edition, vol. 2, page 350). The amine thus obtained is then converted into a carbonyl compound by the action of an oxidizing agent. For this purpose there are suitable, for example halogens, oxygen, if required in the presence of a catalyst such as copper powder, hydrogen peroxide, permanganates, ferric salts, copper salts, nitrous acid and others. A biochemical reaction with the use, for example, of vinegar plant, yeast or the like, may also lead to the desired product. In all oxidation processes any carbon-carbon double linkages and any further oxidizable atomic groupings are temporarily protected in known manner should this be necessary.

The reactive methyl or methylene groups present in the parent materials may be condensed in an analogous manner with nitric acid esters, particularly alkyl nitrates such as methyl or ethyl nitrate instead of with nitroso compounds. The isonitro compounds or their alkali salts thus obtained can then be converted into carbonyl compounds, for example, by the action of a reducing agent and/or a hydrolyzing agent, if required by way of the oxime, by the action of an oxidizing agent such as permanganate or atmospheric oxygen, or by halogenation and thermal scission. Details of these methods will be found, for example, in Houben-Weyl, Methoden der organischen Chemie, III Edition, vol. 2, pages 188, 400.

The α-dicarbonyl or α-ketocarboxylic acid derivatives obtainable by the invention are intended for therapeutic use or for use as intermediate products in the production of therapeutic compounds.

The following examples illustrate the invention, the parts being by weight:—

Example 1

To an alcoholic sodium ethylate solution prepared from 0.23 part of sodium are added 3.15 parts of $\Delta^5$-pregnenol-(3)-one-(20) and then whilst well cooling 1.2 parts of amyl nitrite. After the whole has been allowed to stand for some days in a closed vessel the sodium salt which has precipitated is filtered with suction, washed with a little ether and decomposed with glacial acetic acid. A concentrated aqueous solution of 0.7 part of sodium nitrite is added gradually to the glacial acetic acid solution of the resulting isonitroso compound and when evolution of oxides of nitrogen has ceased the reaction mixture is poured into water. The whole is extracted with ether and the ethereal solution is washed with much water, with a bicarbonate solution and again with water. On evaporation the ethereal solution yields $\Delta^5$-20,21-dioxo-pregnenol-(3) of the formula

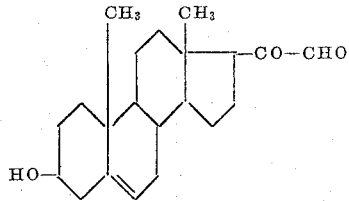

which may advantageously be purified, for example by way of a derivative, for instance by means of a carbonyl reagent.

The oxime may be oxidized by an excess of amyl nitrite instead of nitrous acid.

Instead of the amyl nitrite and alkali alcoholate there may be used e. g. also ethyl nitrite and an alkali metal in ether. Furthermore, instead of alkyl nitrites there may be used for the condensation a nitric acid ester, for example ethyl nitrate; in this case instead of an oxime an isonitro compound is obtained as intermediate product.

Example 2

3.15 parts of $\Delta^5$-pregnenol-(3)-one-(20) and 1.5 parts of para-nitroso-dimethylaniline are dissolved in 40 parts of alcohol, 0.14 part of caustic soda solution of 30 per cent strength is added and the whole is heated in a reflux apparatus until the reaction is ended. Some water is added in order to complete the precipitation of the product and the whole is cooled and filtered with suction and the product is then heated with alcoholic sulfuric acid of 5 per cent strength for 1 hour to boiling in a reflux apparatus. The reaction mixture is then poured into water and the $\Delta^5$-20,21-dioxo-pregnenol-(3) formed is isolated as described in Example 1.

The isonitroso compound may be hydrolyzed by shaking for several hours with ether and dilute sulfuric acid instead of by boiling with alcoholic sulfuric acid. When starting from progesterone instead of from pregnenolone, one obtains a trioxo-pregnene.

What we claim is:

1. A process for the manufacture of carbonyl compounds of steroids, comprising condensing a compound of the steroid series containing the group —$CH_2.CO$— with a member of the group consisting of a nitroso compound and a nitric acid ester and converting the product so obtained into a compound containing the group —CO.CO—.

2. A process for the manufacture of carbonyl compounds of steroids, comprising condensing a compound of the steroid series containing in 17-position an oxo-ethyl radical with a member of the group consisting of a nitroso compound and a nitric acid ester and converting the product so obtained into a compound containing in 17-position the group —CO.CHO.

3. A process for the manufacture of carbonyl compounds of steroids, comprising condensing $\Delta^5$-pregnenol-(3)-one-(20) with a member of the group consisting of a nitroso compound and a nitric acid ester and converting the product so obtained into $\Delta^5$-20,21-dioxo-pregnenol-(3).

4. $\Delta^5$-20,21-dioxo-pregnenol-(3).

KARL MIESCHER.
ALBERT WETTSTEIN.
WERNER FISCHER.